Nov. 24, 1931.  L. E. WRIGHT  1,833,241
LUMINOUS FISH LURE
Filed Feb. 11, 1930

INVENTOR.
LESLIE E. WRIGHT.
BY
ATTORNEYS.

Patented Nov. 24, 1931

1,833,241

UNITED STATES PATENT OFFICE

LESLIE E. WRIGHT, OF NAPA, CALIFORNIA

LUMINOUS FISH LURE

Application filed February 11, 1930. Serial No. 427,562.

My invention relates to improvements in luminous fish lures, and it consists in the combinations, constructions and arrangements hereinafter described and claimed.

An object of my invention is to provide a luminous fish lure in which the luminous paint is protected from the water. To this end I provide a transparent body portion which houses the part of the device carrying the luminous paint.

A further object of my invention is to provide a device of the type described which is extremely simple in construction and which may carry one or more hooks. The device is buoyant so as to float on the water, or it may be so weighted as to be submerged a slight distance below the surface of the water.

Other objects and advantages will appear as the specification proceeds, and the novel features of the device will be particularly pointed out in the claim hereto annexed.

My invention is illustrated in the accompanying drawings, in which.

Figure 1:
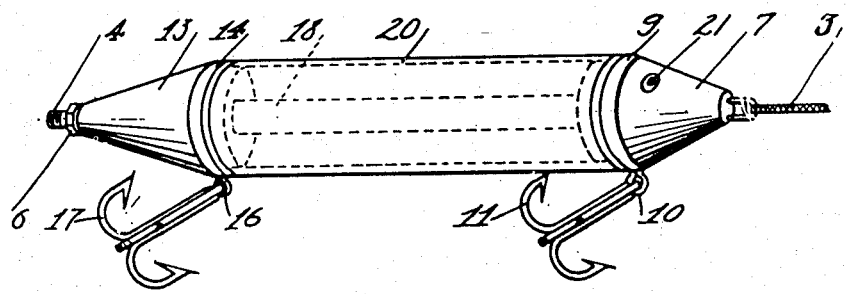
Figure 1 is a perspective view of the device.
Figure 2:
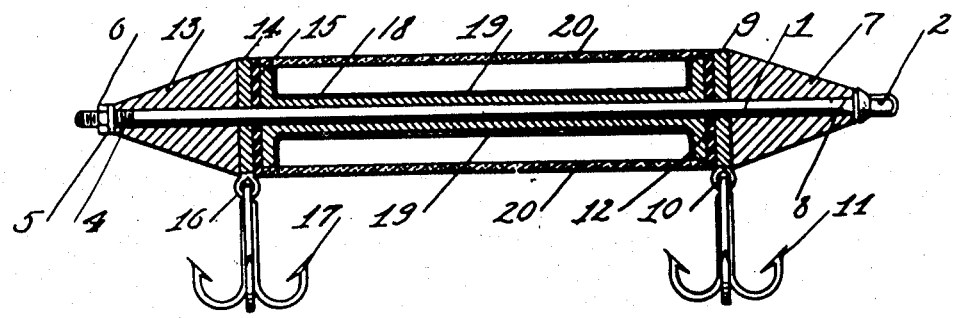
Figure 2 is a longitudinal section through the device.

In carrying out my invention I provide a rod 1 which has an eyelet 2 at one end for receiving a fish line 3 and a threaded portion 4 at the other end for receiving a washer 5 and a nut 6. At the right hand side of the device as shown in Figure 2 I dispose a conical-shaped member 7 that has a bore 8 therein for receiving the rod 1. Next to the member 7 I mount a disc 9, and this disc carries one or more eyelets 10 which in turn support fish hooks 11.

Adjacent to the member 9 I mount a washer 12. The opposite end of the device is also provided with a member 13 similar to the member 7, a disc 14 similar to the disc 9, and a washer 15 similar to the washer 12. The disc 14 carries one or more eyelets 16, and these eyelets carry hooks 17.

Between the washers 12 and 15 I dispose a spool-shaped member 18, and this spool is provided with a luminous paint 19 on its exterior surface. The outer diameter of the spool is slightly less than the diameter of the washer 12. A glass cylinder 20 encloses the spool 18 and bears against the washers 12 and 15 for sealing the inside of the cylinder from water.

If desired, eyes 21 may be painted upon the member 7. The nut 6 is tightened for holding all of the parts together as a unit.

From the foregoing description of the various parts of the device, the operation thereof may be readily understood.

The device is trailed through the water as a bait and the luminous paint shining through the glass 20 will attract fish. This paint may be radiant, phosphorous, or other suitable material. The device may be made light enough to float on the water, or it may be weighted so as to become submerged.

Although I have shown and described one embodiment of my invention, it is to be understood that the same is susceptible of various changes, and I reserve the right to employ such changes as may come within the scope of the invention as claimed.

I claim:

A fish lure comprising a spool covered with a luminous material, a transparent cylinder telescoped over the flanges of the spool, sealing members abutted against the spool flanges and serving as a closure for the ends of the cylinder, and means for securing the sealing members in place, and hooks carried by the securing means.

LESLIE E. WRIGHT.